(12) United States Patent
Dixit et al.

(10) Patent No.: US 11,640,370 B2
(45) Date of Patent: May 2, 2023

(54) DATA MIGRATION USING TRANSACTIONAL DATA AS PRIMARY OBJECT

(71) Applicant: SAP SE, Walldorf (DE)

(72) Inventors: Sharad Dixit, Bangalore (IN); Binoo Chandran, Bangalore (IN); Christian Haas, Heidelberg (DE); Sascha Zimmermann, Heidelberg (DE); Prasanth Alapati, Bangalore (IN); Ashish Anand, Bangalore (IN); Olivier Dreidemy, Holving (FR); Mohannad Ezzo, Leimen (DE); Thomas Konstandin, Walldorf (DE); Abinash Nanda, Ghaziabad (IN); Attila Orban, Blieskastel (DE); Gerd Ritter, Heidelberg (DE)

(73) Assignee: SAP SE, Walldorf (DE)

( * ) Notice: Subject to any disclaimer, the term of this patent is extended or adjusted under 35 U.S.C. 154(b) by 608 days.

(21) Appl. No.: 16/718,613

(22) Filed: Dec. 18, 2019

(65) Prior Publication Data
US 2021/0191900 A1 Jun. 24, 2021

(51) Int. Cl.
*G06F 16/11* (2019.01)
*G06F 16/18* (2019.01)
*H04L 67/10* (2022.01)
*G06F 16/17* (2019.01)
*G06Q 30/01* (2023.01)

(52) U.S. Cl.
CPC ........ *G06F 16/119* (2019.01); *G06F 16/1734* (2019.01); *G06F 16/1865* (2019.01); *H04L 67/10* (2013.01); *G06Q 30/01* (2013.01)

(58) Field of Classification Search
None
See application file for complete search history.

(56) References Cited

U.S. PATENT DOCUMENTS

| 7,991,797 B2 * | 8/2011 | Betz ................... G06F 16/2272 706/50 |
| 2013/0024480 A1 * | 1/2013 | Okun ................... G06F 11/324 707/802 |
| 2016/0283545 A1 * | 9/2016 | Benke ................. G06F 16/2282 |
| 2018/0007409 A1 * | 1/2018 | Xie ................... H04N 21/44204 |
| 2020/0104861 A1 * | 4/2020 | Tsai ................... G06Q 30/0201 |

* cited by examiner

*Primary Examiner* — Thu N Nguyen
(74) *Attorney, Agent, or Firm* — Sterne, Kessler, Goldstein & Fox P.L.L.C.

(57) ABSTRACT

Disclosed herein are system, method, and computer program product embodiments for extracting customer relationship management (CRM) data from an on-premises database for testing with a cloud-based CRM. The extraction approach simplifies, through the use of a wizard, the selection of relevant customer records and their extraction, along with any dependencies on other records. The extracted records can then be uploaded to the cloud-based CRM for evaluation.

20 Claims, 9 Drawing Sheets

Step 1 of Data Extraction: Scope Selection

↑ Next  [7]

Run ID: Test_Extract_Demo
Language: EN English

Scope of Extraction
☑ Opportunities
☑ Leads
☑ Activities 400
402
404

DATA MIGRATION USING TRANSACTIONAL DATA AS PRIMARY OBJECT

BACKGROUND

Businesses have moved to cloud-based solutions for many of their business processes. For example, modern customer relationship management (CRM) systems are typically cloud-based systems that allow businesses to not only access and view data about their customers, but to simplify access to the data from anywhere by their employees. And businesses benefit from features as they are added to the cloud-based CRM system.

Legacy on-premise CRM systems receive fewer feature upgrades and updates than cloud-based systems. This is because updates to a cloud-based CRM can be applied to all customers simultaneously without disrupting operations, such that everyone is always on the most current build. This leads to a feature gap between the new generation of cloud-based CRM systems and legacy on-premise CRM systems. Additionally, maintenance of legacy CRM systems typically involves not only knowledge of the CRM software, but of unique configurations of CRM systems that are often located and managed on-premises.

Accordingly, approaches are needed to simplify the testing and migration of data from legacy CRM systems to newer systems, including cloud-based CRM.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for facilitating migration of data structures from an on-premise database to a cloud-based storage solution, by way of non-limiting example.

As cloud-based data storage solutions continue to dominate new installations, many businesses face challenges with the maintenance of legacy systems. For example, customer relationship management (CRM) systems employed by many businesses to manage and track interactions with their customers were often deployed on-premise—either locally to a business, or at a facility leased by the business for data warehousing.

Legacy CRM systems deployed on-premise suffer from several limitations compared to newer cloud-based solutions. For example, on-premise software must be routinely maintained by end customers—patched, upgraded, and otherwise reviewed—in order to keep it in working order and add new features. In contrast, cloud-based solutions routinely receive the latest features and patches from the provider of the cloud-based solution, without any need for individual maintenance from the end customer.

Figure 1:
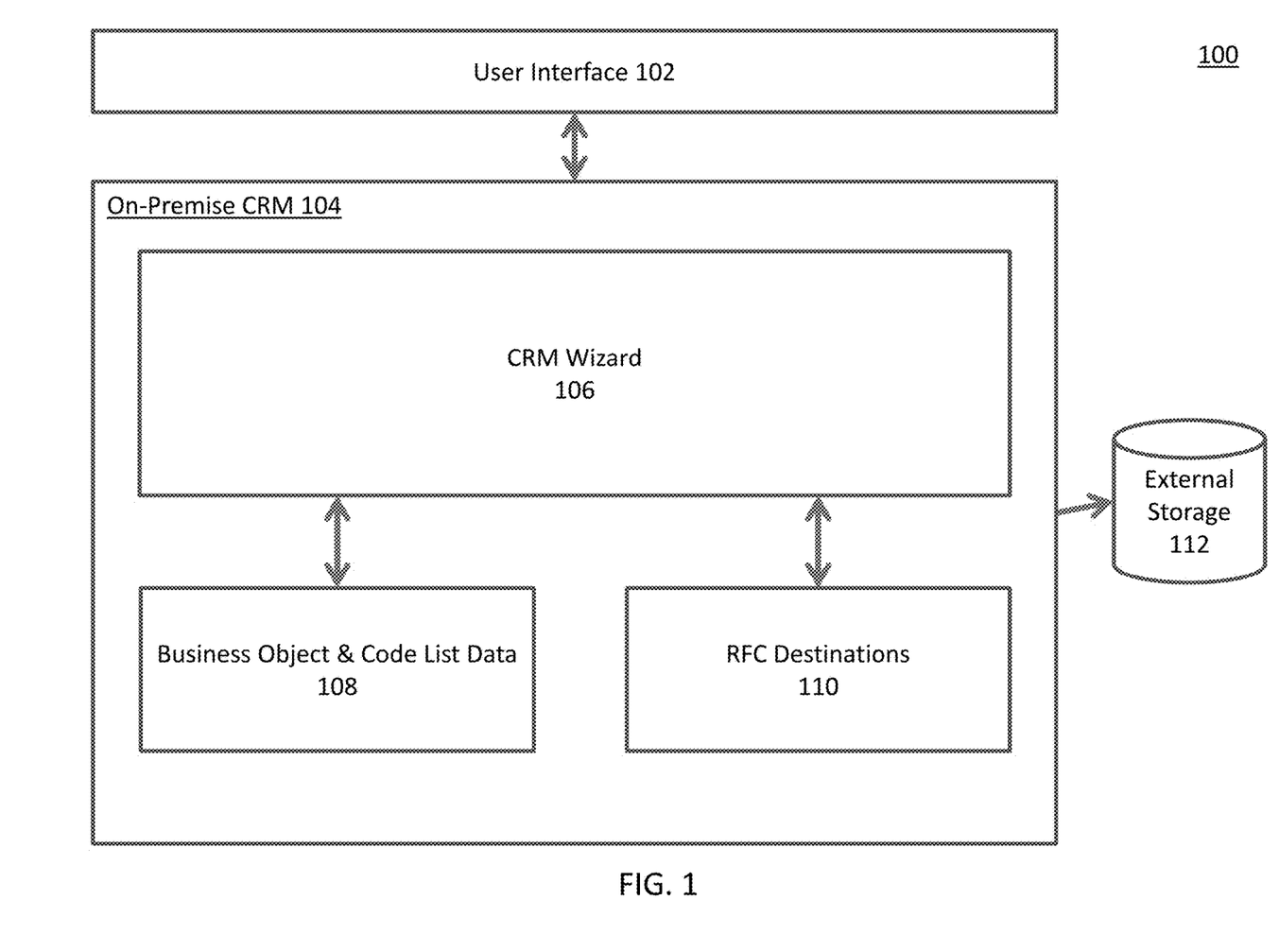
FIG. 1 illustrates a CRM migration system using a CRM wizard, in accordance with an embodiment.

For these reasons, significant incentives exist to migrate data from on-premise CRM systems to the cloud. FIG. 1 illustrates a CRM migration system 100 using a CRM wizard, in accordance with an embodiment. In this exemplary approach, a user interface 102 allows a user, such as a system administrator, to interact with an on-premise CRM 104 through a CRM wizard 106. The CRM wizard 106 allows the user to select objects, such as a business object, and code list data 108 to export to external storage 112, such as a cloud-based CRM platform. By way of non-limiting example, CRM wizard 106 establishes a connection with external storage 112 using RFC destinations list 110.

Migrating the full data set from on-premise CRM 104 to external storage 112 requires significant testing to ensure that all data has been correctly migrated and is fully operational. Instead of fully migrating data 108 to external storage 112, the purpose of CRM wizard 106 is to migrate a set of business objects from data 108 to external storage 112. That set of business objects, potentially including tens of thousands or more records, may be further limited to some subset of records through the CRM wizard 106. In limiting the business objects and records migrated to external storage 112, a user of on-premise CRM 104 may test the functionality of external storage 112 (such as a cloud-based CRM system).

With this rapid extraction and upload approach, administrators may be able to rapidly evaluate whether the external storage 112 (e.g., a cloud-based CRM system) is appropriate for their needs, without needing to spend significant time porting their entire dataset to the cloud. Instead, this approach allows for evaluation of the cloud-based CRM system with a minimalistic data set that is nevertheless representative of the administrator's needs.

Figure 2:
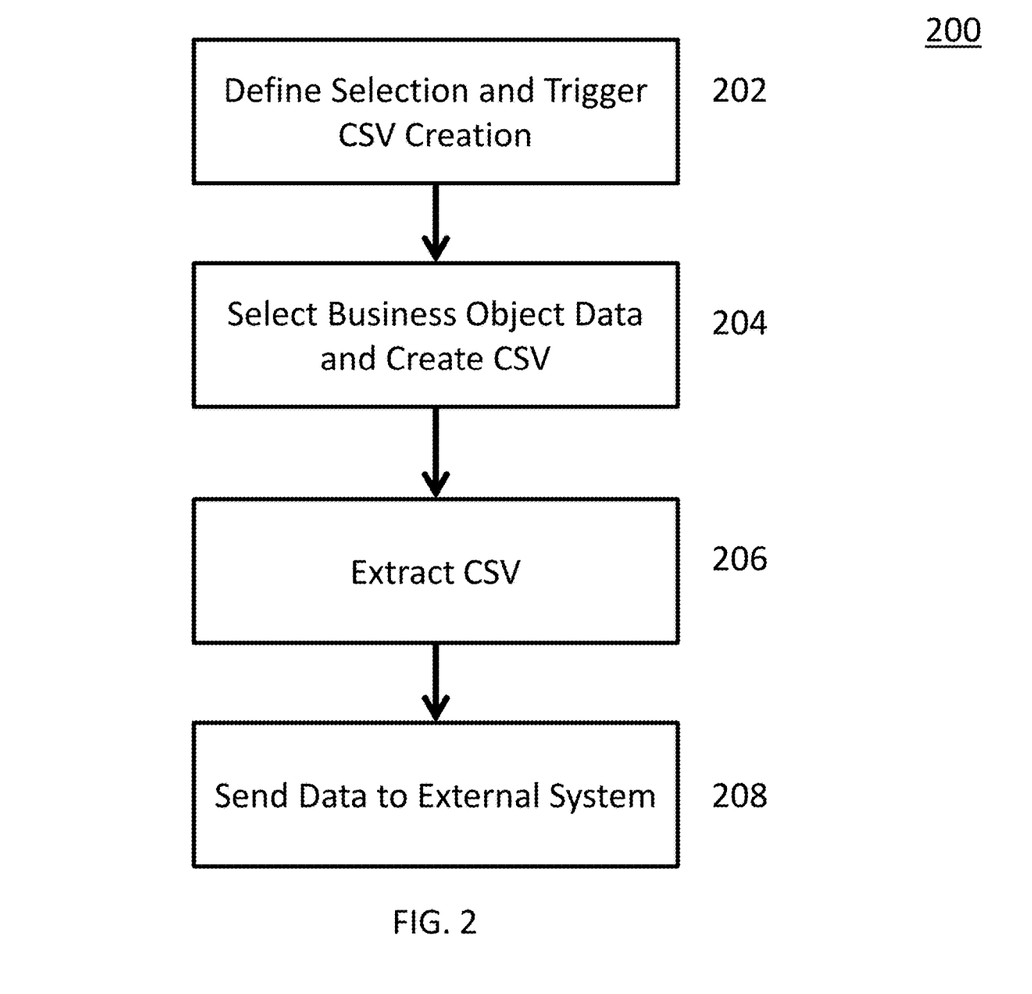
FIG. 2 is a flowchart illustrating steps by which business objects from an on-premise CRM may be migrated to an external storage, in accordance with an embodiment.

FIG. 2 is a flowchart 200 illustrating steps by which business objects from an on-premise CRM may be migrated to an external storage, in accordance with an embodiment. The process begins at step 202 where a selection of primary business objects is made and creation of a comma separated value (CSV) file usable to export data from the primary business objects is triggered.

In accordance with an embodiment, a list of primary business objects available for extraction is presented to a user for selection. These primary business objects are defined within the on-premise CRM, and are shown for selection through a user interface of a wizard. By way of non-limiting example, FIGS. 4-8 illustrate screenshots of the wizard usable to not only select the primary business objects for export, but to perform the export process.

At step 204, business object data associated with the selected primary business objects is selected and used to create the CSV file. In accordance with an embodiment, business object data associated with the selected primary business objects includes not only records within a given primary business object itself, but records within one or more secondary business objects upon which the primary business object depends. In accordance with a further embodiment, selection of the business object data includes filtering records within the primary and one or more secondary business objects based on filter criteria. Filter criteria may include, for example, a limit on a number of returned records, date ranges for the creation or modification of records, and matches on fields within the records.

In accordance with an embodiment, the records are stored within a database. When the records are read, they are accessed from one or more corresponding tables within the database, as would be understood by one skilled in the relevant art.

At step 206, the necessary records selected for export are extracted into one or more CSV files. One skilled in the relevant arts will appreciate that, although the format of these extracted records is discussed in the form of CSV file(s), any file structure that preserves the structure and relationship of the various records retrieved from the primary and secondary business objects may be used. In an embodiment, any delimiter may be used, of which comma separation is an example delimiter.

Then, at step 208, the CSV file(s) may be sent to the external system for export. In an embodiment, the external system is a cloud-based CRM, and the cloud-based CRM accepts delimited files (such as the CSV file(s)) for the purpose of reading business object data and creating a cloud-based CRM from the extracted business object data. The delimited file may be downloaded to a local device by a user and then uploaded to the external system, may be sent directly to the external system from the process, or may be accessed by the external system from either a local device or a system associated with the process.

Figure 3:
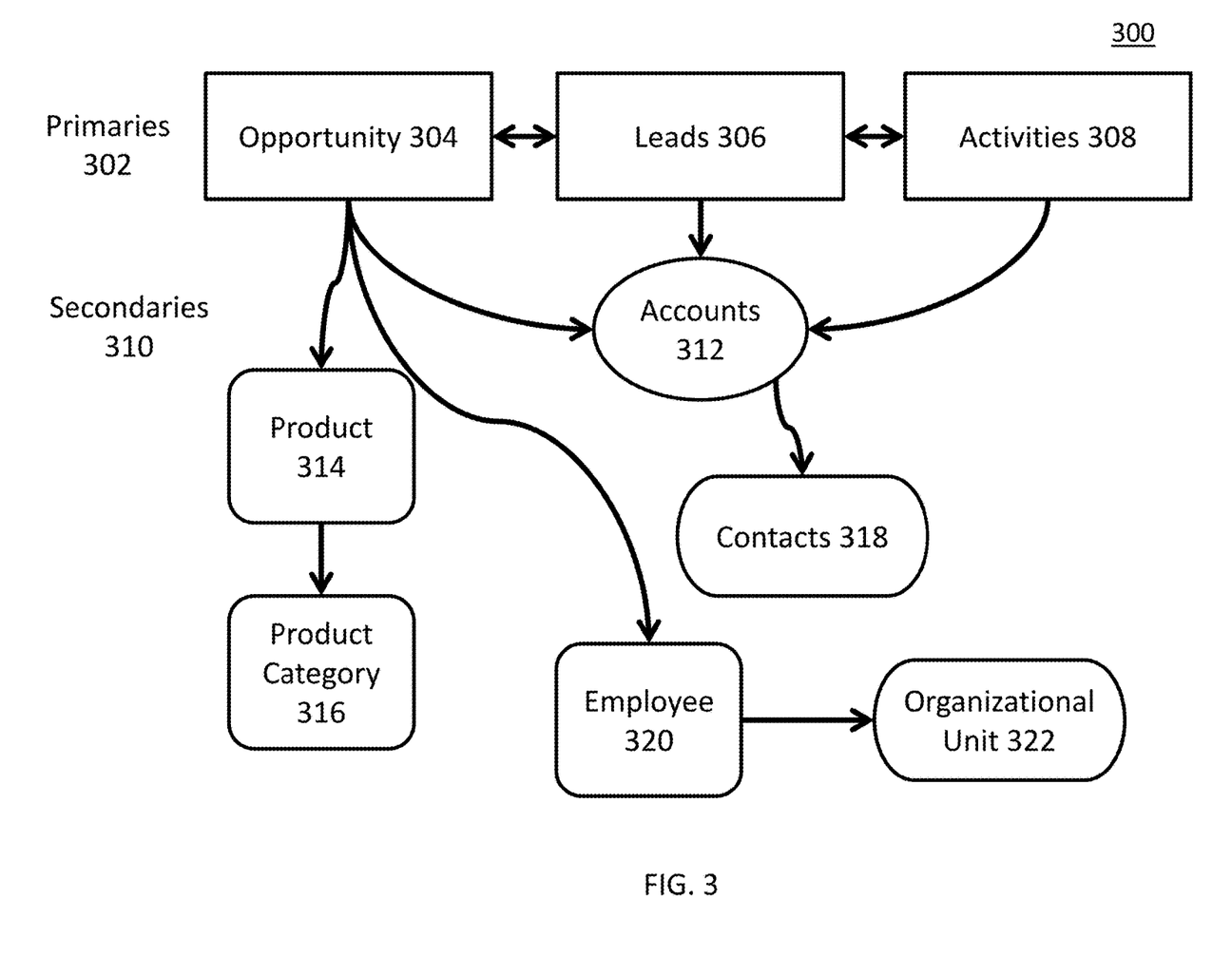
FIG. 3 illustrates an exemplary extraction flow of primary and secondary business objects, in accordance with an embodiment.

FIG. 3 illustrates an exemplary extraction flow 300 of primary and secondary business objects, in accordance with an embodiment. In this example, extraction of any primary business object 302 (e.g., opportunity 304, leads 306, or activities 308), requires the extraction of records from secondary business object 310, namely accounts 312.

Specifically, records corresponding to an opportunity 304 include a key value of an account 312 corresponding to that given opportunity. Therefore, in order to extract an opportunity 304 record, any corresponding account 312 records must also be extracted. Similarly, leads 306 and activities 308 have keyed references to accounts 312.

However, rather than retrieve every single opportunity record in opportunity 304, and likewise every account record in accounts 312, filters may be applied to each object or attribute of an object, such that only those opportunity records and account records matching the filter criteria are retrieved, resulting in one or more compact CSV files for export.

Additional secondary business objects 310 may also include records that, in some instances, will need to be part of the CSV file(s). For example, accounts 312 may reference contacts 318, and so contact records corresponding to an account record may need to be included. Similarly, product 314 records for a given opportunity 304 may be needed, as well as product category 316 records for each product 314. And employee 320 records for employees associated with an opportunity 304 may be needed, as well as an organizational unit 322 record corresponding to the employee 320 record.

Given the number of business objects in this example alone, it is possible to imagine the large number of records that could be present in a given example configuration. With a large number of records, extraction and export becomes expensive if filters are not applied to the records. The CRM wizard simplifies this process.

Figure 4:
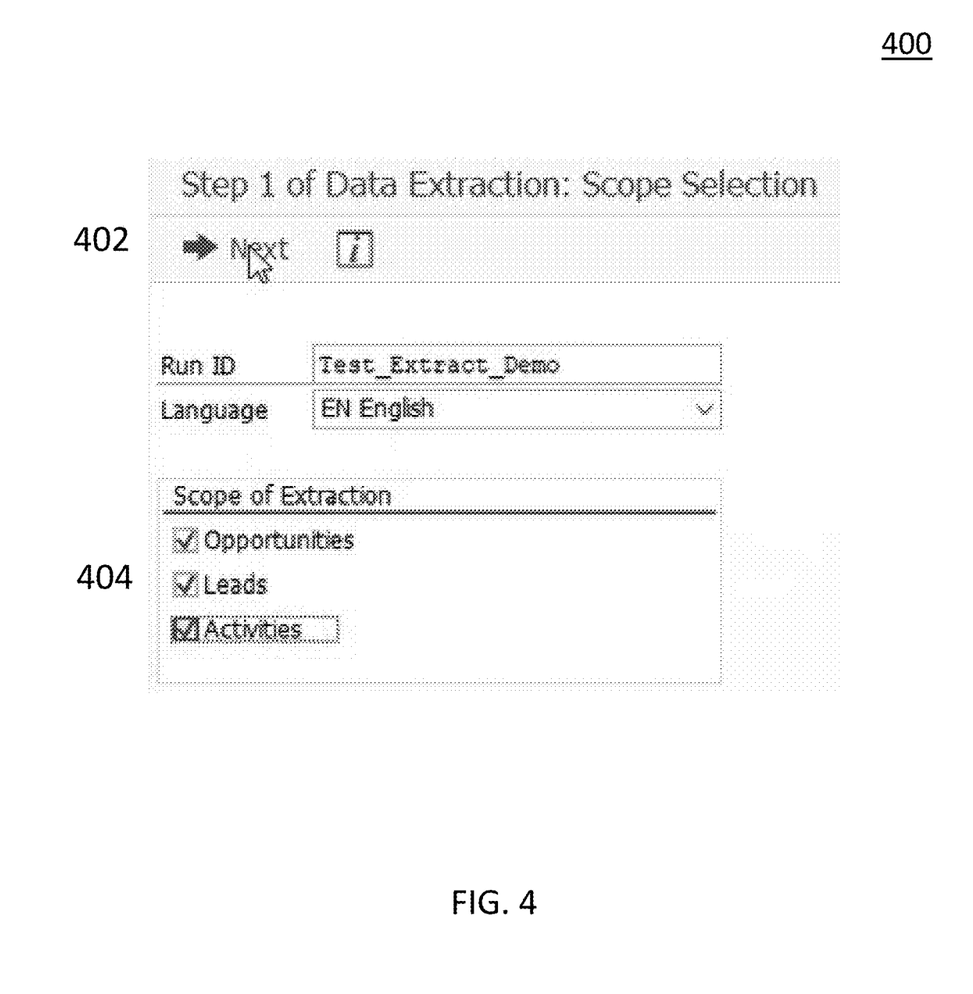
FIG. 4 illustrates a scope selection menu, in accordance with an embodiment.

FIG. 4 illustrates a scope selection menu 400, in accordance with an embodiment. In this menu, a user may select any or all of the primary business objects 404 from a list for extraction. In accordance with an embodiment, the user may click a 'next' button 402 to proceed to the next step of the wizard.

Figure 5:
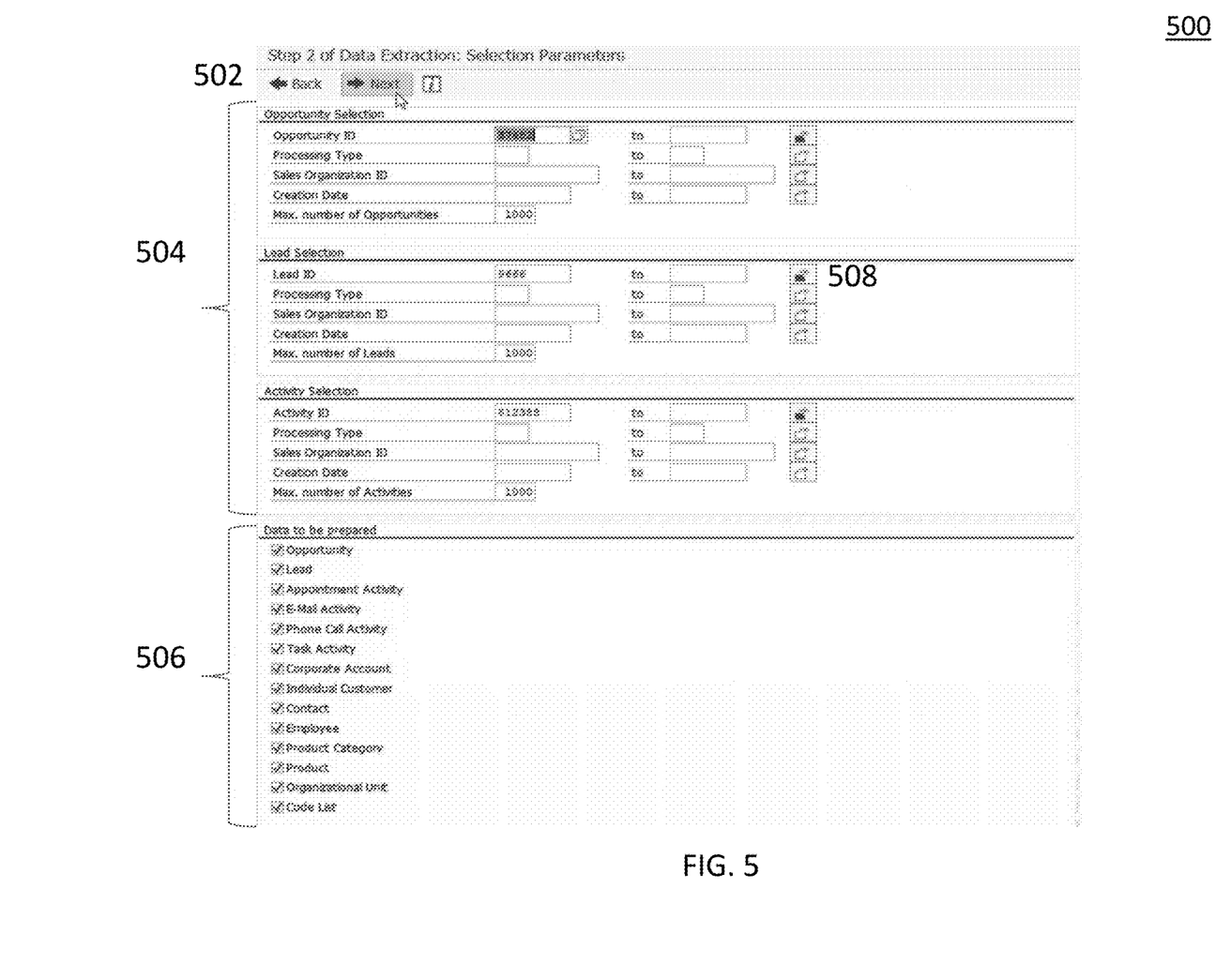
FIG. 5 illustrates a record selection filter menu, in accordance with an embodiment.

FIG. 5 illustrates a record selection filter menu 500, in accordance with an embodiment.

In this menu, the primary business objects are shown in area 504 with a number of available filter options, in accordance with an embodiment. For example, a given primary business object may be limited to specific IDs, creation dates, or even to a maximum quantity of records. Area 506 allows selection of additional records to be included with the primary business objects and any required secondary business objects. Once the selection criteria is applied, a user may click on the 'next' button by way of example to advance to the next step.

Figure 6:
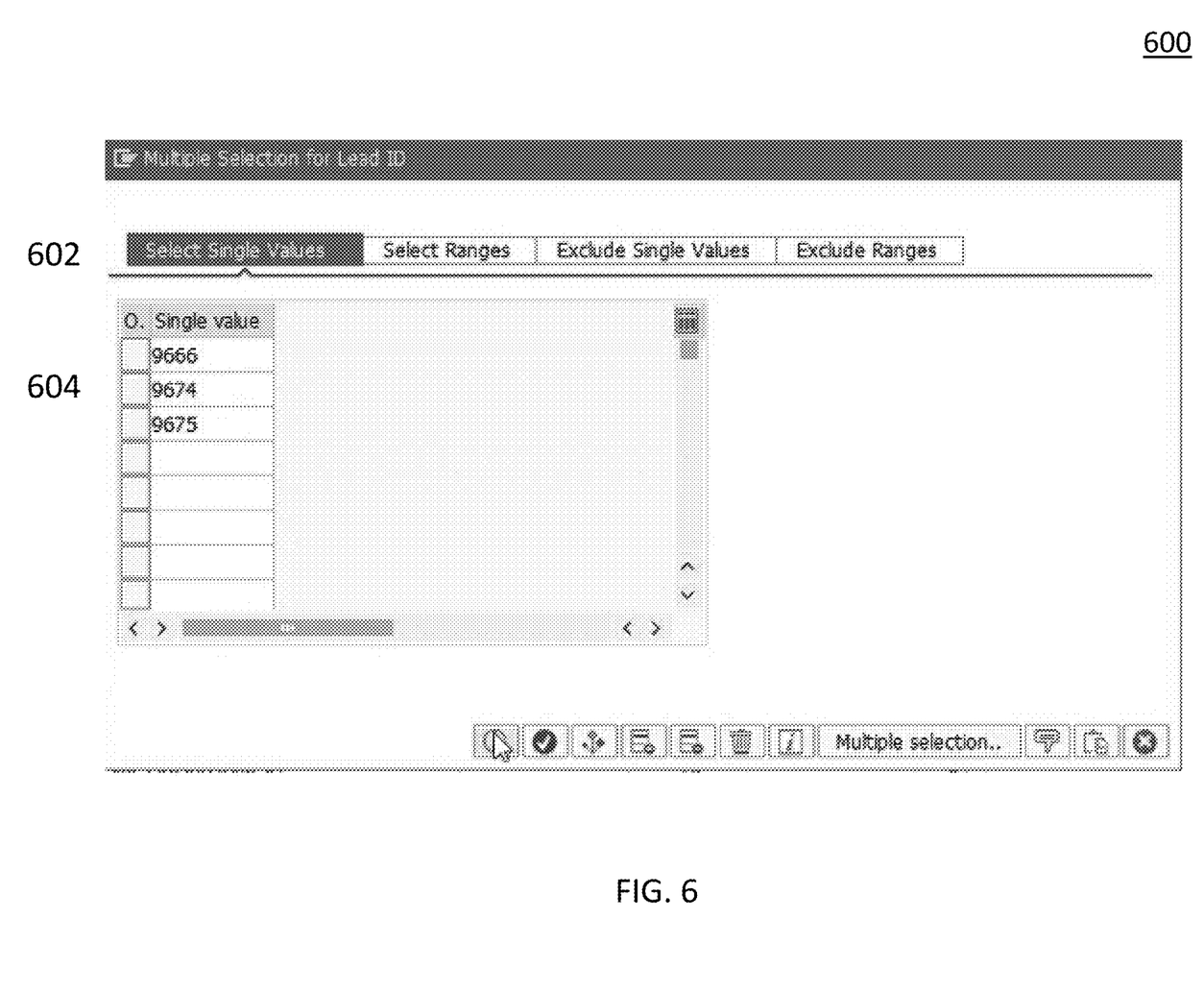
FIG. 6 illustrates a selection menu, in accordance with an embodiment.

Button 508 is an exemplary button for applying filter criteria to a specific element. As shown in menu 500, button 508 corresponds to the Lead ID field for the 'Lead' primary business object. FIG. 6 illustrates a selection menu 600, in accordance with an embodiment, corresponding to the 'Lead' primary business object. Tabs 602 of menu 600 allow for different selection approaches, including single values, ranges, excluding single values, and excluding ranges. As shown in the example of FIG. 6, menu 600 is configured with the select single values tab, and three specific lead key values have been entered in fields 604. In this example therefore, the three leads corresponding to lead 9666, 9674, and 9675 will be selected, and all others will be excluded.

Figure 7:
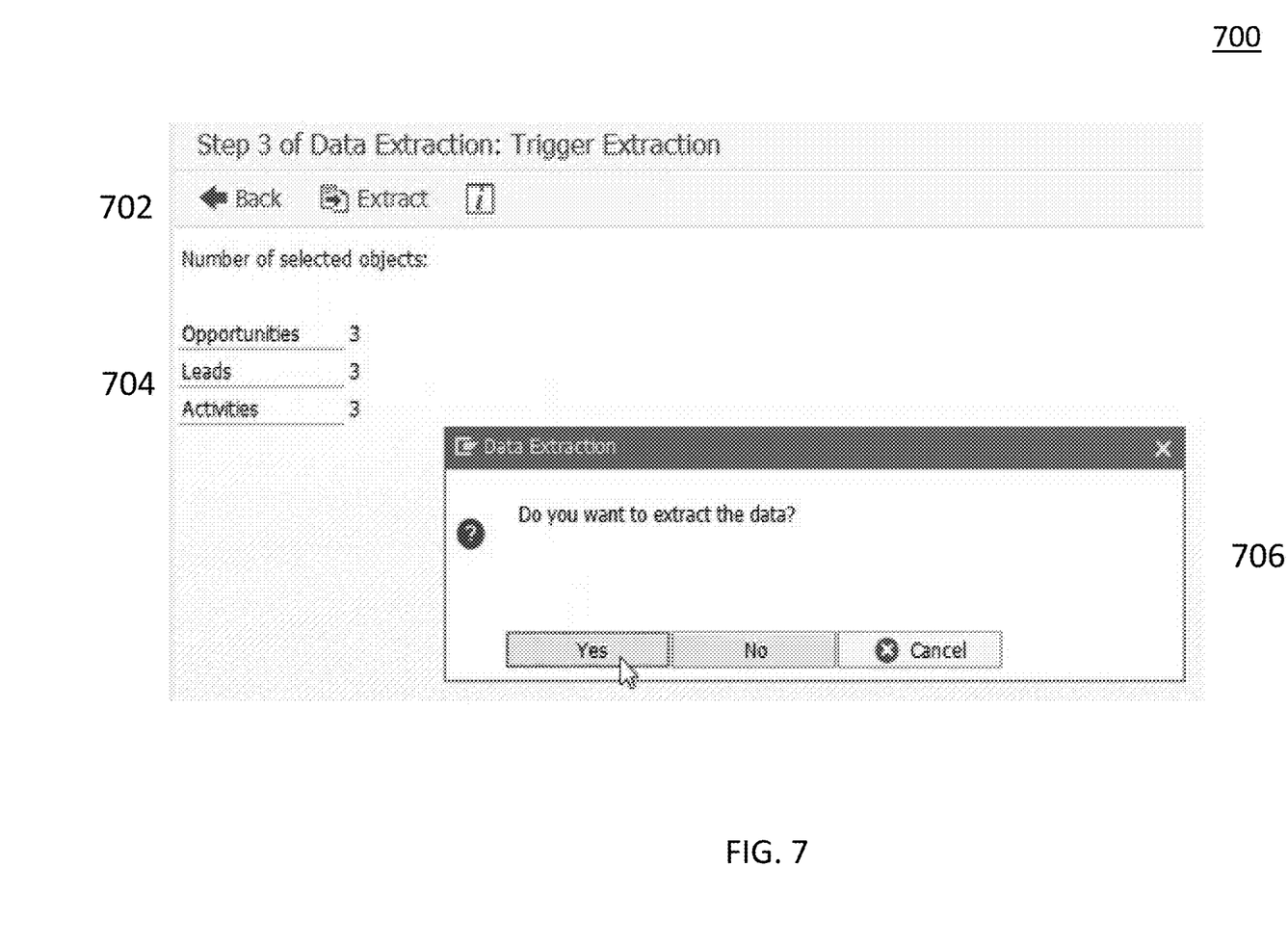
FIG. 7 illustrates a trigger extraction menu, in accordance with an embodiment.

Proceeding from the scope selection menu 400 of FIG. 4, FIG. 7 illustrates a trigger extraction menu 700, in accordance with an embodiment. In this menu 700, a user can see a number of selected objects of each type of business object in list 704 (in this case, three opportunities, three leads, and three activities will be selected). The user may then click on extract button 702, and confirm extraction in confirmation menu 706 to trigger the extraction, in accordance with an embodiment.

Figure 8:
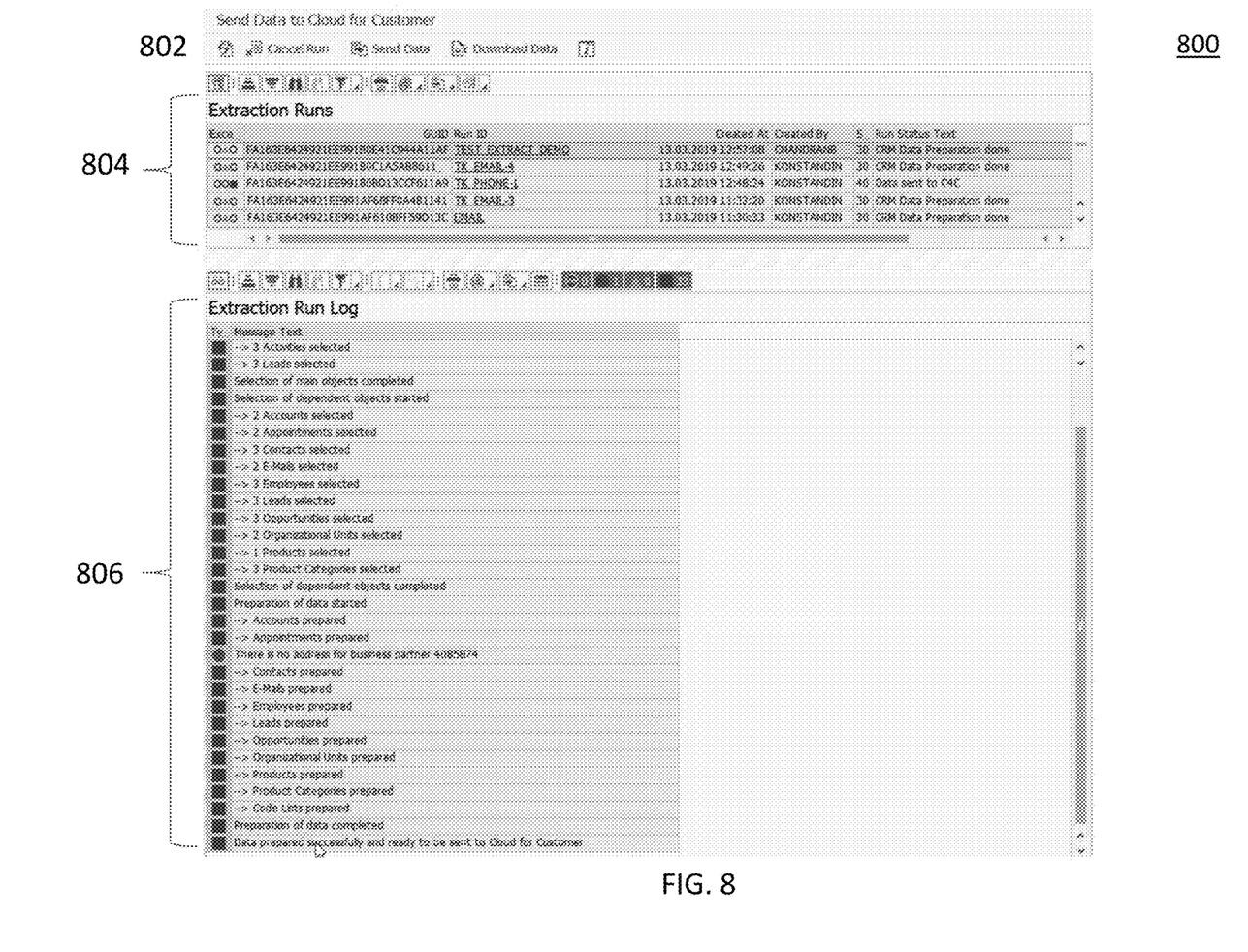
FIG. 8 illustrates a log menu in accordance with an embodiment.

FIG. 8 illustrates a log menu 800 in accordance with an embodiment. Log menu 800 includes an extraction run list 804 showing the status of prior extractions, and run log 806 showing the selected records and status of the current run. Upon completion of the current extraction, data transfer buttons 802 (e.g., a send data and/or download data button) may be used to transfer CSV or otherwise-formatted CRM data to the cloud or other external storage.

In accordance with an embodiment, the run log 806 may be generated to include a warning indicating that a field corresponding to a record for one of the primary business object or the secondary business object is missing. For example, as shown in run log 806, the warning 'There is no address for business partner 4085874' indicates a missing record in the Contacts object for the account associated with ID 4085874. In accordance with an embodiment, the CSV file(s) may be generated with a placeholder for the missing record.

Figure 9:
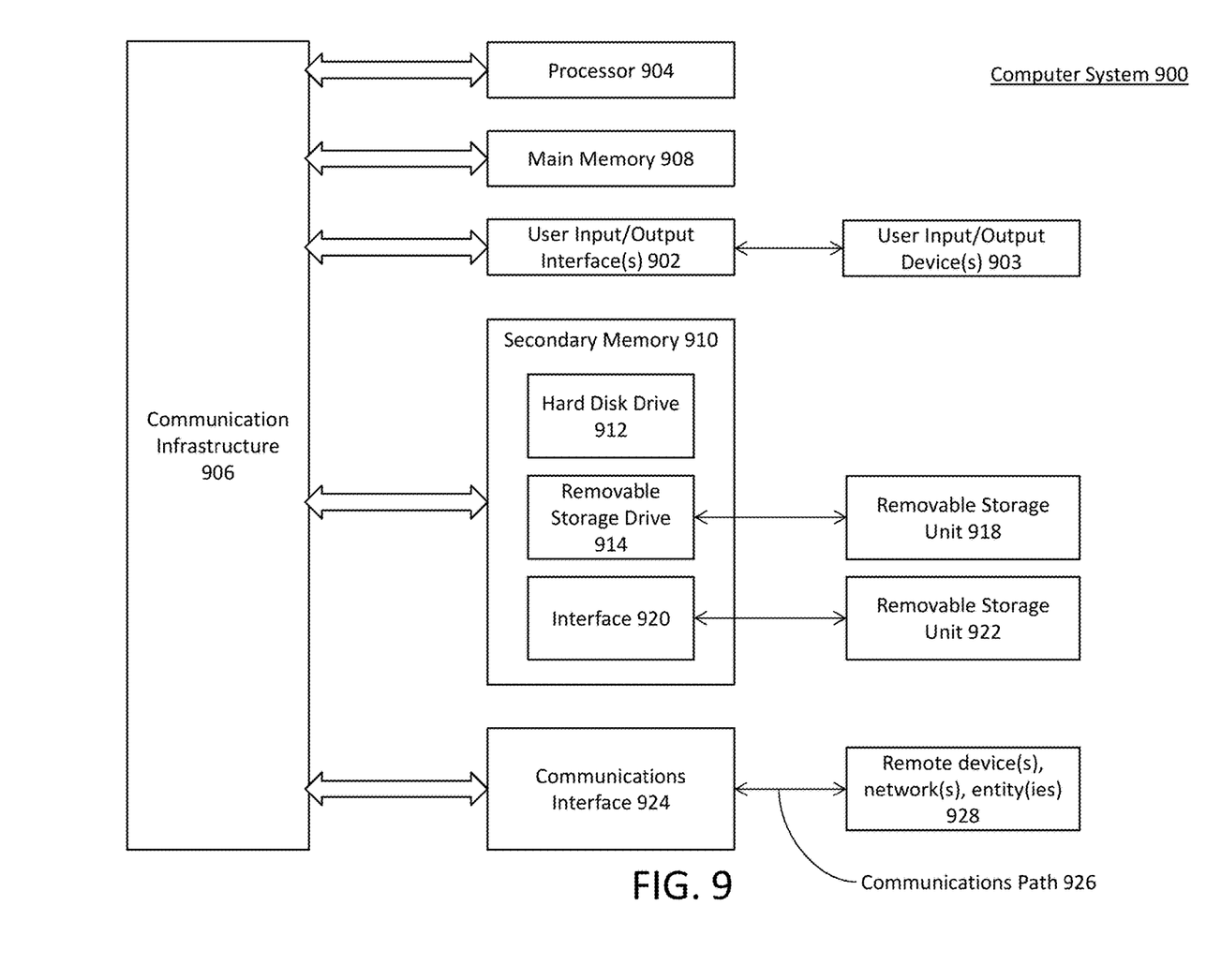
FIG. 9 is an example computer system useful for implementing various embodiments.

Various embodiments may be implemented, for example, using one or more well-known computer systems, such as computer system 900 shown in FIG. 9. One or more computer systems 900 may be used, for example, to implement any of the embodiments discussed herein, as well as combinations and sub-combinations thereof.

Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   presenting, by one or more computing devices, a list including a primary object selectable for extraction;
   receiving a selection of the primary object for extraction;
   identifying, by the one or more computing devices, a secondary object which depends upon and is referenced by the primary object, responsive to the selection of the primary object for extraction;
   extracting, by the one or more computing devices, a first plurality of records of the primary object and a second plurality of corresponding records of the secondary object as a delimited document; and
   providing, by the one or more computing devices, the delimited document, including both the first plurality of records and the second plurality of records, to an external system for migration to the external system.

2. The computer implemented method of claim 1, wherein extracting the primary object and the secondary object comprises:
   reading, by the one or more computing devices, a plurality of tables from a customer premises database, wherein the plurality of tables comprise records corresponding to the primary object and the secondary object.

3. The computer implemented method of claim 1, further comprising:
   identifying, by the one or more computing devices, an additional secondary object upon which the secondary object depends; and
   extracting, by the one or more computing devices, the additional secondary object to the delimited document.

4. The computer implemented method of claim 1, wherein providing the delimited document to the external system comprises:
   uploading, by the one or more computing devices, the delimited document to the external system comprising a cloud based customer relationship management (CRM) system, wherein the cloud based CRM system is configured to provide remote access to data within the primary object and the secondary object.

5. The computer implemented method of claim 1, further comprising:
   receiving, by the one or more computing devices, selection criteria regarding the primary object,
   wherein extracting the primary object and the secondary object comprises extracting records from underlying database tables corresponding to the primary object and the secondary object that satisfy the selection criteria.

6. The computer implemented method of claim 5, wherein the selection criteria comprises a limit on a quantity of the records to extract.

7. The computer implemented method of claim 1, further comprising:
   generating, by the one or more computing devices, an extraction run log that includes a warning indicating that a field corresponding to a record for one of the primary object or the secondary object is missing.

8. A system, comprising:
   a memory configured to store operations; and
   one or more processors configured to perform the operations, the operations comprising:
      presenting a list including a primary object selectable for extraction, receiving a selection of the primary object for extraction;
      identifying a secondary object which depends upon and is referenced by the primary object, responsive to the selection of the primary object for extraction;
      extracting a first plurality of records of the primary object and a second plurality of corresponding records of the secondary object as a delimited document; and
      providing the delimited document, including both the first plurality of records and the second plurality of records, to an external system for migration to the external system.

9. The system of claim 8, wherein extracting the primary object and the secondary object comprises:
   reading a plurality of tables from a customer premises database, wherein the plurality of tables comprise records corresponding to the primary object and the secondary object.

10. The system of claim 8, the operations further comprising:
    identifying an additional secondary object upon which the secondary object depends; and
    extracting the additional secondary object to the delimited document.

11. The system of claim 8, wherein providing the delimited document to the external system comprises:
    uploading the delimited document to the external system comprising a cloud based customer relationship management (CRM) system, wherein the cloud based CRM system is configured to provide remote access to data within the primary object and the secondary object.

12. The system of claim 8, the operations further comprising:
    receiving selection criteria regarding the primary object, wherein extracting the primary object and the secondary object comprises extracting records from underlying database tables corresponding to the primary object and the secondary object that satisfy the selection criteria.

13. The system of claim 12, wherein the selection criteria comprises a limit on a quantity of the records to extract.

14. A computer readable storage device having instructions stored thereon, execution of which, by one or more processing devices, causes the one or more processing devices to perform operations comprising:
    presenting a list including a primary object selectable for extraction;
    receiving a selection of the primary object for extraction;
    identifying a secondary object which depends upon and is referenced by the primary object, responsive to the selection of the primary object for extraction;
    extracting a first plurality of records of the primary object and a second plurality of corresponding records of the secondary object as a delimited document; and
    providing the delimited document, including both the first plurality of records and the second plurality of records, to an external system for migration to the external system.

15. The computer readable storage device of claim 14, wherein extracting the primary object and the secondary object comprises:
    reading a plurality of tables from a customer premises database, wherein the plurality of tables comprise records corresponding to the primary object and the secondary object.

16. The computer readable storage device of claim 14, the operations further comprising:
    identifying an additional secondary object upon which the secondary object depends; and
    extracting the additional secondary object to the delimited document.

17. The computer readable storage device of claim 14, wherein providing the delimited document to the external system comprises:
    uploading the delimited document to the external system comprising a cloud based customer relationship management (CRM) system, wherein the cloud based CRM system is configured to provide remote access to data within the primary object and the secondary object.

18. The computer readable storage device of claim 14, the operations further comprising:
    receiving selection criteria regarding the primary object, wherein extracting the primary object and the secondary object comprises extracting records from underlying database tables corresponding to the primary object and the secondary object that satisfy the selection criteria.

19. The computer readable storage device of claim 18, wherein the selection criteria comprises a limit on a quantity of the records to extract.

20. The method of claim 1, further comprising:
    determining a filter criteria comprising a limit on a number of records to return; and
    applying the filter criteria to reduce the first plurality of records below the limit specified by the filter criteria.

* * * * *